United States Patent
Damet et al.

(10) Patent No.: US 10,853,223 B2
(45) Date of Patent: Dec. 1, 2020

(54) SIMULATION OF TRANSACTIONS

(71) Applicant: Arm Limited, Cambridge (GB)

(72) Inventors: Benjamin Jean-Baptiste Damet, Cambridge (GB); Mihail Ivanov Atanassov, Fulbourn (GB)

(73) Assignee: Arm Limited, Cambridge (GB)

( * ) Notice: Subject to any disclaimer, the term of this patent is extended or adjusted under 35 U.S.C. 154(b) by 80 days.

(21) Appl. No.: 15/875,155

(22) Filed: Jan. 19, 2018

(65) Prior Publication Data
US 2019/0227901 A1 Jul. 25, 2019

(51) Int. Cl.
| | |
|---|---|
| G06F 9/44 | (2018.01) |
| G06F 11/36 | (2006.01) |
| G06F 8/30 | (2018.01) |
| G06F 8/20 | (2018.01) |
| G06F 9/46 | (2006.01) |
| G06F 9/455 | (2018.01) |

(52) U.S. Cl.
CPC ........... *G06F 11/3604* (2013.01); *G06F 8/22* (2013.01); *G06F 8/31* (2013.01); *G06F 9/455* (2013.01); *G06F 9/466* (2013.01); *G06F 11/3668* (2013.01)

(58) Field of Classification Search
CPC .................................................. G06F 11/3604
USPC .......................................................... 717/135
See application file for complete search history.

(56) References Cited

U.S. PATENT DOCUMENTS

| | | | | |
|---|---|---|---|---|
| 8,170,859 | B1* | 5/2012 | Christensson | G06F 9/4812 703/22 |
| 8,332,619 | B2* | 12/2012 | Jacobson | G06F 9/30087 712/220 |
| 9,323,874 | B2* | 4/2016 | Bashore | G06F 17/5022 |
| 9,626,187 | B2* | 4/2017 | Cain, III | G06F 9/30087 |
| 2007/0157138 | A1* | 7/2007 | Ciolfi | G06F 17/504 716/136 |
| 2012/0005661 | A1* | 1/2012 | Johnston | G06F 9/44521 717/148 |
| 2019/0057173 | A1* | 2/2019 | Ventroux | G06F 17/5022 |

OTHER PUBLICATIONS

R. Bedichek, "Some Efficient Architecture Simulation Techniques", Winter 1990 USENIX Conference, 1990, 12 pages.

* cited by examiner

*Primary Examiner* — Evral E Bodden
(74) *Attorney, Agent, or Firm* — Nixon & Vanderhye P.C.

(57) ABSTRACT

Simulation processing is performed on a host apparatus in respective time periods to simulate operation of simulated agents of a target apparatus. During each time period, the simulation processing exclusively simulates operation of a single simulated agent. When the target program code processed in a current time period allocated for simulation of a given simulated agent includes a transaction start instruction representing a start of a transaction comprising instructions executed between the transaction start instruction and a transaction end instruction for which effects of the instructions of the transaction are to be committed when the transaction end instruction is reached in the absence of the transaction being aborted, it is detected whether the current time period ends before the transaction end instruction of the transaction is reached, and if so the transaction is aborted. This enables a correct transaction behaviour to be simulated without requiring memory conflict checking.

19 Claims, 9 Drawing Sheets

SIMULATION OF TRANSACTIONS

BACKGROUND

Technical Field

The present technique relates to the field of data processing. More particularly, it relates to the simulation, on a host data processing apparatus, of operation of simulated agents of a target data processing apparatus executing target program code.

Technical Background

A simulation computer program may be provided for controlling processing of target program code on a host processing apparatus to simulate processing of the target program code on a target data processing apparatus. This can be useful for enabling the target program code, which has been written according to a certain instruction set architecture with certain features to be executed on a host data processing apparatus, which may not support those features. For example, the host apparatus may not support all types of instructions defined in the instruction set architecture. Simulation may be useful for a number of reasons. For example, when the hardware of the target data processing apparatus supporting the instruction set architecture is still in development, it may be desirable to start development of software to execute according to that architecture, to reduce delay in software development once the target apparatus supporting the instruction set architecture is actually ready, and/or to provide feedback on how software executes on the architecture so that modifications to the architecture can be made if necessary. Another example may be for backwards compatibility reasons, where a piece of legacy software written for one architecture may be desired to be executed on a host data processing apparatus having a different architecture. Regardless of the particular reasons for performing the simulation, in general such a simulation may enable the target program code to execute on the host data processing apparatus to achieve functionality similar to that expected if the program target program code was executed on the target data processing apparatus, even if the host does not support the same features of the target data processing apparatus. For example certain hardware features of the target data processing apparatus may be simulated using software executed within the simulator program, or the simulator may map certain instructions of the target program code onto alternative instructions supported by the host data processing apparatus. However, there can be a design challenge in enabling the behaviour of the target program code to be simulated appropriately without introducing large performance overheads.

SUMMARY

At least some examples provide a method comprising:
performing, in a series of time periods, simulation processing on a host data processing apparatus to simulate operation of a plurality of simulated agents of a target data processing apparatus processing target program code, in which during each of the time periods, the simulation processing exclusively simulates operation of a single simulated agent of said plurality of simulated agents; and
when the target program code processed in a current time period allocated for simulation of a given simulated agent includes a transaction start instruction representing a start of a transaction comprising one or more instructions executed between the transaction start instruction and a transaction end instruction for which effects of the instructions of the transaction are to be committed when the transaction end instruction is reached in the absence of the transaction being aborted:
 detecting whether an end of the current time period occurs before the transaction end instruction of the transaction is reached; and
 aborting the transaction when it is detected that the end of the current time period occurs before the transaction end instruction of the transaction is reached.

At least some examples provide a non-transitory storage medium storing a computer program for controlling the host data processing apparatus to perform the method described above.

At least some examples provide a host data processing apparatus comprising processing circuitry, and a non-transitory storage medium storing a computer program for controlling the processing circuitry for performing the method described above.

At least some examples provide a non-transitory storage medium storing a computer program comprising:
simulation program logic to perform, in a series of time periods, simulation processing on a host data processing apparatus to simulate operation of a plurality of simulated agents of a target data processing apparatus processing target program code, in which during each of the time periods, the simulation processing exclusively simulates operation of a single simulated agent of said plurality of simulated agents;
the simulation program logic comprising transaction simulation program logic to simulate processing of a transaction comprising one or more instructions executed between the transaction start instruction and a transaction end instruction for which effects of the instructions of the transaction are to be committed when the transaction end instruction is reached in the absence of the transaction being aborted; in which:
when the target program code processed in a current time period allocated for simulation of a given simulated agent includes a transaction start instruction representing a start of a transaction, the transaction simulation program logic is configured to:
 detect whether an end of the current time period occurs before the transaction end instruction of the transaction is reached; and
 abort the transaction when it is detected that the end of the current time period occurs before the transaction end instruction of the transaction is reached.

Further aspects, features and advantages of the present technique will be apparent from the following description of examples, which is to be read in conjunction with the accompanying drawings.

DESCRIPTION OF EXAMPLES

Figure 1:
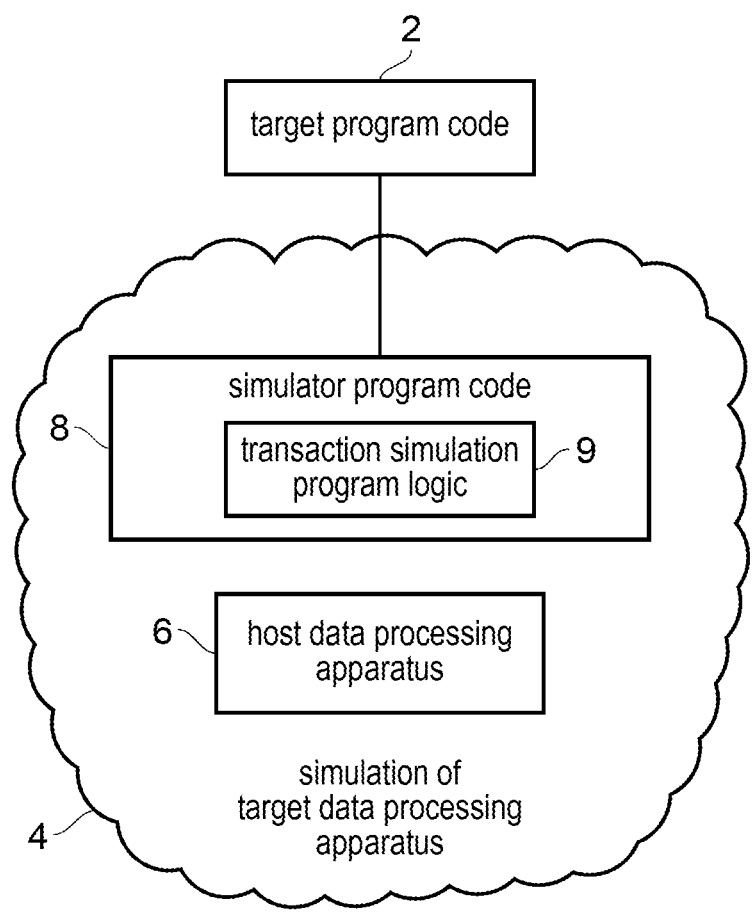
FIG. 1 schematically illustrates an example of a simulation of a target data processing apparatus using simulator program code executing on a host data processing apparatus so as to provide an execution environment for target program code similar to that expected in the target data processing apparatus.

Some data processing apparatuses support hardware transactional memory (HTM), which allows software running on the apparatus to declare transactional contexts during which the software executed behaves as if it has exclusive atomic access to the memory of the data processing apparatus. For example the apparatus may support a transaction start instruction and a transaction end instruction which can be used to bound sequences of instructions which are intended to be executed as a transaction. The effects of the instructions executed between the transaction start instruction and the transaction end instruction may be committed when the transaction end instruction is reached in the absence of the transaction being aborted. Reasons for aborting transactions can vary, but may include detected memory conflicts (where another agent in the system accesses a memory location which is also accessed by the transaction, for example), the occurrence of an exception or interrupt, or the execution of a type of instruction which is not supported within a transaction, for example.

However, if the transactional memory behaviour of a target data processing apparatus is simulated on a host data processing apparatus, the checking for memory conflicts (which may be expected to be performed if the HTM features were implemented in hardware in the target apparatus) may be a badly scaling problem when implemented inside a software model. For example, hardware implementations of HTM may use tag data recorded in caches to track which addresses have been accessed by the transaction or by other processes and can use this tag data to detect conflicts between conflicting accesses from different processes. However modelling caches in a software simulation may be extremely expensive. For example, it has been found that modelling caches may cause approximately 10 times drop in performance compared to when a cache model is disabled. Hence, the typical approach for implementing HTM in hardware may not map well to implementation within a simulation.

One approach for addressing this performance problem may be to provide a simulation which always fails the transaction at the beginning. That is, as soon as a transaction start instruction is encountered within target code whose processing is being simulated by the simulation processing, the transaction could be immediately aborted. Effectively this may disable the transaction functionality of the target code. Code written using transactions typically may include an alternative fall back code path which can be executed if transactions keep aborting, and so if the simulation simply aborts any transactions encountered, this may enable forward progress in program execution to be continued using the fall back path. However, this approach would mean that the simulation may not provide a realistic view of the likely behaviour of the target code if it was executed on a real hardware target data processing apparatus. Also, it may only allow the fall back code path to be simulated or tested, but may not enable detection of any issues associated with the transaction path itself. This may reduce the usefulness of simulating the processing of the target code. For example if the purpose of the simulation was to assist with development of the software before the hardware of the target process is available, then if transactions are always failed at the beginning then the transaction code path may not be adequately tested until the hardware is ready. This can cause delays in the development process.

The inventors recognised that some simulation techniques may use a quantum-based approach to simulation, in which the processing resources of the host apparatus are time-shared over a series of time periods. The target data processing apparatus being simulated may be expected to have a number of simulated agents whose operation needs to be simulated in the simulation processing. For example, a simulated agent could correspond to a particular hardware processor core or other processing element for executing target code within the simulated target data processing apparatus, a given software thread executed in the target data processing apparatus (e.g. different threads executing on the same processor core of the target data processing apparatus could be considered different simulated agents), or an element of the target data processing apparatus which does not directly execute target code itself, but provides support functionality which can be invoked by, or may influence, execution of code on other simulated agents (e.g. interrupt controllers or peripheral interfaces). In quantum-based simulation techniques, the simulation processing may be divided into a series of time periods and within each time period, the simulation processing may exclusively simulate the operation of a single simulated agent of the multiple simulated agents of the target data processing apparatus.

The inventors recognised that the exclusive access to host system resources provided during each time period can be exploited to avoid any need for checking for memory conflicts. If a transaction both starts and ends within the same time period, then it can be guaranteed that no other simulated agent has had access to system resources between the start and end of the transaction, and so whether the transaction may be committed can be determined by the simulation regardless of whether any memory conflict checking is performed. On the other hand, if the end of the current time period occurs before the transaction end instruction of the transaction is reached then it can no longer be guaranteed that there have been no intervening conflicts in memory access from other simulated agents, and so in this case the transaction can be aborted to avoid needing to check for memory access conflicts.

Hence, when the target program code processed in the current time period allocated for simulation of a given simulated agent includes a transaction start instruction that represents the start of the transaction, the simulation detects whether an end of the current time period occurs before the transaction end instruction of the transaction is reached, and aborts the transaction when it is detected that the end of the current time period occurs before the transaction end instruction of the transaction is reached. Hence, with this approach no special handling needs to occur for detecting memory conflicts, which would generally slow down memory accesses. This greatly helps to improve performance in the simulation. While there could be some transactions which are aborted because they span the boundary between time periods used for quantum based simulation (which would not have needed to be aborted in a hardware implementation of HTM), any reduction in performance caused by retrying or aborting those transactions may be relatively limited compared to the performance gains in avoiding the memory conflict checking. With this approach, it is still possible to simulate the processing of transactions within a software model, enabling improved diagnostic information about the transaction code path, which would not be possible in the "always-fail-transactions" approach discussed above, but the performance of the simulation can be greatly improved.

Hence, while the simulation processing may process the target program code according to a target instruction set architecture which specifies that the transaction should be aborted in response to detecting a conflict between a memory access triggered by an agent processing the transaction and a memory access triggered by another agent, the simulation processing does not actually need to check for such conflicts. Instead the simulation processing may simulate processing of the transaction without checking for conflicts between memory accesses triggered by the given simulated agent and memory accessors triggered by other simulated agents.

The detection of whether the end of the current time period occurred before the transaction end instruction of the transaction was reached may be performed at different timings within the simulation. In some cases the detection could be performed at the end of the current time period (the time period which includes the processing of the transaction start instruction). For example when the time period allocated to a given simulated agent ends, the simulation code could check whether there are any transactions still outstanding and if so take action to trigger an abort of the transaction. The abort could occur at the same time that the detection is performed, or could happen later. For example some status information could be set if it is detected that there was a transaction outstanding at the end of the current time period and then later when processing of the transaction is resumed, the status information could be checked to trigger aborting the transaction.

Another approach can be to perform the detecting (of whether the end of the current time period occurred before the transaction end instruction was reached) at the start of the next time period allocated for simulation of the given simulated agent, after the time period which included the transaction start instruction. In some simulation models this may be easier to implement then attempting to include additional functionality at the end of the current time period. For example some simulation models may include functionality which enables scheduling of additional code sequences to be executed by the host apparatus before the next time period allocated for simulation of a given simulated agent.

In another approach the detecting could be performed in response to reaching the transaction end instruction itself.

In some implementations the detection of whether the end of the current time period was reached before the transaction end is reached could be performed at the same time subsequent aborting of the transaction if it is detected that the end of the time period was reached before the transaction end instruction. Hence, when it is detected that the transaction was still outstanding at the end of the current time period which included the transaction start instruction, this could immediately trigger an abort of the transaction.

However in other approaches the detection and the aborting may be separated in time so that following the detecting step, some status information may be stored indicating whether the end of the current time period occurs before the transaction end instruction of the transaction is reached. This status information could then be checked at a later time to determine whether the transaction should be aborted, e.g. the status information could be checked on reaching the transaction end instruction. This status information can be inaccessible to the target program code itself. Instead the status information may comprise simulation control data which is accessible to the simulator code controlling the simulation processing but is not made readable by the target program code.

A variety of methods may be used to control the way in which this status information may be set. For example, a flag associated with a given simulated agent could be set in response to a transaction start instruction executed in the target code associated with that simulated agent and, if set, cleared at the start of a new time period allocated for the given simulated agent. When the transaction end instruction of the transaction processed for the given simulated agent is reached, if the flag associated with the agent simulated agent is not set then the transaction could be aborted.

However, in one approach the setting of the status information could be performed using a status-setting code sequence which may be scheduled to execute between the end of the current time period and the start of the next time period allocated for simulation of the given simulated agent. In response to the transaction start instruction, execution of the status-setting code sequence may be scheduled. The timing at which the status-setting code sequence is scheduled to execute may be any time after the end of the current time period and before the start of the next time period allocated to the given simulated agent. The status-setting code sequence may include one or more instructions for setting status information to a predetermined value. Later, the simulation processing may determine whether the status information is set to a predetermined value, and may abort the transaction (without committing its results to architectural state) when the status information is set to the predetermined value. Hence, if the transaction end instruction is reached within the same time period as the transaction start instruction, the status-setting code sequence will not yet have executed and so the transaction can be allowed to commit. On the other hand if the transaction end instruction is encountered in a later time period than the time period which included the transaction start instruction, then the preliminary code sequence will have executed in the meantime and so the predetermined value of the status information will be detected and this may trigger aborting the transaction to ensure that a transaction which is executed across multiple time periods (so that there is a risk of a conflicting memory access during the transaction) is aborted.

If the transaction end instruction is reached and the status information is determined to have a value other than the predetermined value, then scheduling of the status setting code sequence can be cancelled. This ensures that if the transaction is started and committed within a single time period of the simulation, then the status-setting code sequence will not be executed.

The checking of the status information set by the status-setting code sequence can be performed at different times. For example, the determining of whether the status information is set to the predetermined value could be performed:

in response to the transaction end instruction;
in response to at least a subset of instructions of the transaction; or
in response to a maintenance event scheduled at one or more predetermined timings (either within the time period allocated to a given simulated agent or at some other timing, e.g. by creating another agent to perform the check).
at the start of the next time period allocated to the given simulated agent.

If a transaction is aborted due to detecting that the end of the current time period occurred before the transaction end instruction of the transaction was reached, then the simulation may also set a retry indication to a first value to indicate that it is possible that a further attempt to process the transaction may be successful (as opposed to a second value indicating that a further attempt to process the transaction would likely be unsuccessful). The first time a given transaction fails due to an abort, if this is due to expiry of the current time period before the transaction end instruction was reached, this means that the length of the transaction exceeded the time available between the time at which the transaction start instruction was encountered and the end of the current time period. The next time the same simulated agent is allocated a time period for simulation processing, if the transaction is retried then it is likely this will start nearer the beginning of the time period, so there is more time available for completing the transaction before the end of that time period. Hence, it can be useful to enable the target program code to make at least one attempt to retry the transaction if it failed due to the expiry of the current time period. In contrast, for other abort causes (such as the execution of an instruction unsupported in a transaction), the retry indication may be set to the second value to indicate that the same abort event would likely occur again if the transaction is retried.

The target code may include instructions which use the retry indication to determine whether to retry the transaction or switch to an alternative fallback code path. For example, the target code may be written according to an ISA which uses the retry indication to provide a hint to software on whether a transaction is worth retrying. Hence, when a transaction is aborted as an artefact of the simulation due to the relative timing between the start of the transaction and the end of the time period allocated to the given simulated agent, it is useful to set this retry hint to the first value to signal that it is possible another attempt could succeed, to increase the chance that the transaction code path can be adequately tested in the simulation and reduce the need to rely on alternative code paths (which may use locks to provide atomic access to memory for example), which may be less efficient than the transaction memory path.

FIG. 1 schematically illustrates an example of a simulation of a target data processing apparatus for executing target program code 2. The simulation 4 is provided using a host data processing apparatus 6 providing hardware which supports a certain host instruction set architecture (ISA) and simulator program code 8 defined according to the host ISA which executes on the host data processing apparatus 6. The simulator program code 8 provides an interface to the target program code 2 which is similar to the interface which would be provided to the target program code 2 if the target program code 2 was executed by a target data processing apparatus which has hardware support for the target ISA with which the target program code 2 is written. The host data processing apparatus 6 may not support all the functionality of the target ISA and so such functionality can instead be simulated by software program logic and data structures maintained by the simulator program code. In other words, the instruction execution environment which is provided by the simulator program code 8 when executing on the host data processing apparatus 6 may be the same or substantially the same as the instruction execution environment provided by a real target data processing apparatus supporting the architecture expected for the target program code 2. Simulator programs 8 may be implemented using a variety of methods. Varieties of simulator computer programs include emulators, virtual machines, models, and binary translators, including dynamic binary translators. While the simulator program code 8 is shown as a single layer of program code 8 in FIG. 1, in some examples there may be multiple layers of simulation between the host hardware 6 and the target program code 2. Also, while FIG. 1 shows a single instance of simulator program code 8, some systems may support multiple distinct simulation environments provided on the same host processor to support target code designed for different instruction set architectures.

Hence, the processing circuitry, instruction decoder support and memory access hardware of the target apparatus may be simulated by the simulator program code 8 using suitable software constructs or features. For example, the instruction decode circuitry and processing circuitry for implementing the processing operations corresponding to certain types of instructions according to the target ISA may be implemented using instruction detection/remapping program logic within the simulator program code 8. Also, memory access control program logic may be provided for performing operations for controlling access to memory by the target program code 2, such as address translation functionality or page table management. Part of the function of the memory access control program logic may be to map addresses of the simulated address space used by the target program code 2 onto the host address space used by the host apparatus 6. The simulated program code may also include peripheral simulation program logic which may simulate the behaviour of peripheral devices which are not actually provided in the host apparatus 6 but may be simulated as if they are present. Also, the simulator program code 8 may include transaction simulation program logic 9 for simulating transaction memory functionality. An overview of simulation is given in "Some Efficient Architecture Simulation Techniques", Robert Bedichek, Winter 1990 USENIX Conference, Pages 53-63. Any of the simulation techniques discussed in this paper may be used to implement the simulator program code 8 shown in FIG. 1. A recording medium may be provided to store the simulator program 8, which may be a non-transitory program medium.

Note that in some cases the target program code 2 may include not only applications to be executed, but also program code corresponding to more privileged levels of execution, such as operating systems and/or hypervisors. Hence the target program code 2 need not correspond to a single application but could correspond in general to a set of code to be executed on the simulation 4 as if it was executing on the target data processing apparatus.

Figure 2:
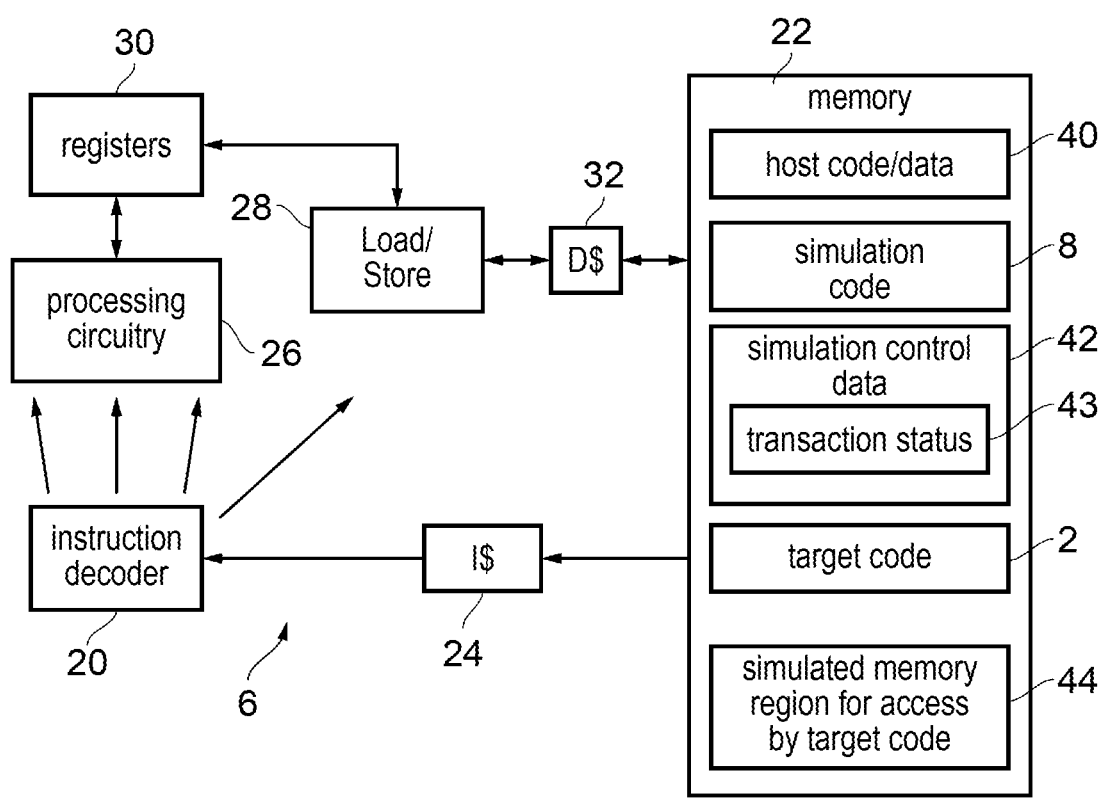
FIG. 2 schematically illustrates an example of the host data processing apparatus.

FIG. 2 schematically illustrates an example of the host data processing apparatus 6 for executing the simulator program code 8 and the target program code 2. The host apparatus 6 has an instruction decoder 20 for decoding instructions fetched from memory 22 via an instruction cache 24, and in response to the decoded instructions, generating control signals for controlling execution units 26, 28 to perform operations corresponding to the decoded instructions. For example the execution units may include processing circuitry 26 for performing arithmetic or logical operations in response to arithmetic or logical instructions, and a load/store unit 28 for performing load/store (memory access) operations to transfer data between memory 22 and registers 30, possibly via a data cache 32. The processing circuitry 26 may itself include a number of different execution units, for example an integer ALU for performing integer arithmetic or logical operations, a floating point unit for performing operations on floating point operands, and a vector processing unit for performing vector operations involving vector operands comprising multiple data elements. The processing circuitry 26 reads source operands from the registers 30, processes the source operands and writes the results of processing back to the registers 30. The load/store unit 28 performs load and store operations using memory addresses calculated based on source values in registers 30 and/or parameters specified in the encoding of the instructions decoded by the instruction decoder 20. The addresses derived from the instruction encoding and/or register operands are virtual addresses. A memory management unit (MMU) may be provided to translate the virtual addresses into physical addresses used by the memory system 22, 32, 24.

When executing the simulator program code 8 and target program code 2 as shown in FIG. 1, then regions in the host memory address space of the memory 22 are allocated for a number of different purposes, including:

Host code/data 40. This represents program code and data used by the host which is not directly related to the simulator 8 or the target program code 2, but may for example represent other applications, operating systems or hypervisor software of the host processor.

Simulation code 8. This is the simulator program code 8 shown in FIG. 1 for controlling the host data processing apparatus 6 to behave, when executing the target code 2, as if it is the target data processing apparatus.

Simulation control data 42. This represents control data used by the simulator program code 8 to provide an emulation of the properties of the target data processing apparatus. For example some instructions of the target code 2 may require some additional metadata to be stored by the simulator to ensure the response to subsequent instructions is similar to that expected if the earlier instruction of the target code had been executed on a real target data processing apparatus. Also the simulation control data 42 could include translated portions of target code which have been mapped to host instructions supported by the instruction decoder 20 of the host apparatus 6. Also the simulation control data 42 may specify transaction status information 43 which will be discussed in more detail below. The simulation control data 42 may be allocated to a region of the host address space which is inaccessible to the target code 2.

The target code 2 itself.

A simulated memory region 44. This represents a region of the host address space which has been allocated for use by the target code 2 to simulate a corresponding part of a simulated address space from which the addresses are specified by the target code 2.

While the regions 40, 8, 42, 2, 44 are shown in FIG. 2 as distinct contiguous blocks in memory, it will be appreciated that each of these blocks could be mapped to multiple discontiguous regions of the host address space.

Figure 3:
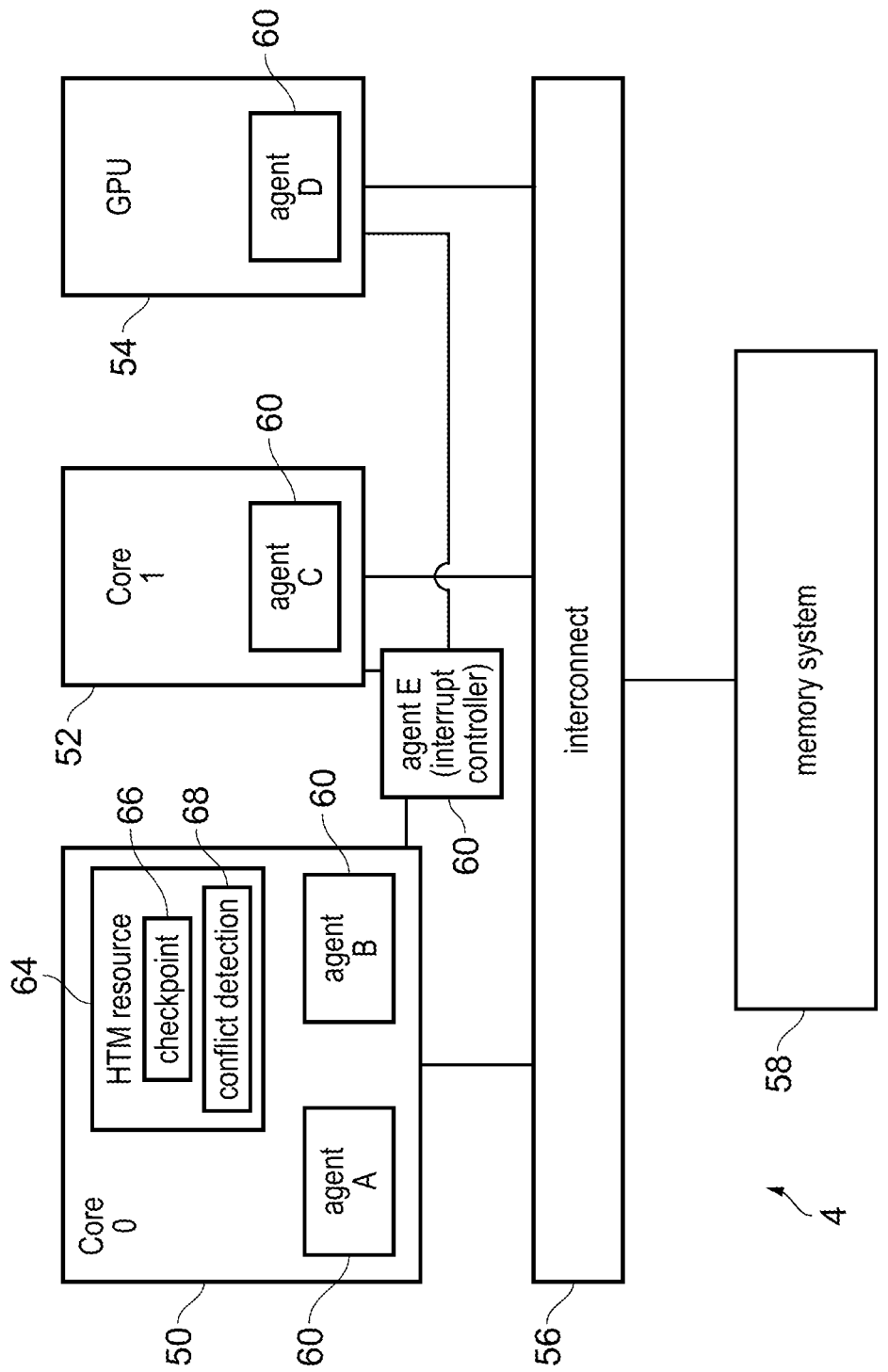
FIG. 3 shows an example of multiple simulated agents in the target data processing apparatus simulated using the simulator code.

FIG. 3 schematically illustrates an example of the target data processing apparatus 4 which is simulated by the simulator program code 8. Note that from the point of view of the simulator the target data processing apparatus is not a real apparatus. The target program code 2 is designed for execution on a real hardware apparatus corresponding to the target data processing apparatus 4 and the simulator 8 is provided to ensure that execution of a target program code on the simulation gives equivalent results to those that would be provided by the real hardware target apparatus 4.

The target apparatus 4 may include a number of processing elements such as processing cores 50, 52 or a graphics processing unit 54. The processing elements may each execute one or more threads of processing. Interconnects 56 may control access to a memory system 58 by the respective processing elements 50, 52, 54.

Hence, the simulator program code 8 may simulate the operation of a number of simulated agents 60 within the target data processing apparatus. Some simulated agents 60 may correspond to threads of processing which would be processed in parallel if they were performed by a real hardware implementation of the target processing apparatus 4. Each thread of processing could be controlled using different sequences of program instructions, or in some cases multiple threads may each execute using substantially the same set of program instructions but with different data inputs. In some cases, some agents may correspond to the processing performed by different hardware processing elements of the simulated target processing apparatus 4, such as an agent C processed by processor core 52 and another agent D processed by the GPU 54. However, in other cases the simulated agents simulated by the simulator program 8 could correspond to multiple software processes executed by the same processing element, such as the agents A and B which are both executed by a processor core 50 in the example of FIG. 3. Also, some simulated agents could correspond to elements of the target apparatus 4 which do not directly execute the target code 2, but provide other functionality supporting the processing of the target code on other simulated agents. For example, agent E in the example of FIG. 3 corresponds to an interrupt controller of the simulated target apparatus 4, which controls handling of interrupts or exceptions and can assist in the distribution of asynchronous events.

A processor may support an architectural form of speculation called transactional memory. Transactional memory can be useful in cases where multiple threads of processing executing within a data processing system (either time-shared on a single processing element or executing on different processing elements in parallel) need to access a shared resource and the nature of the data processing operations may be such that once a thread starts interacting with the shared resource, it may be necessary for a set of operations to complete atomically using the resource without another thread accessing the resource in the meantime. One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which accesses the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

Figure 4:
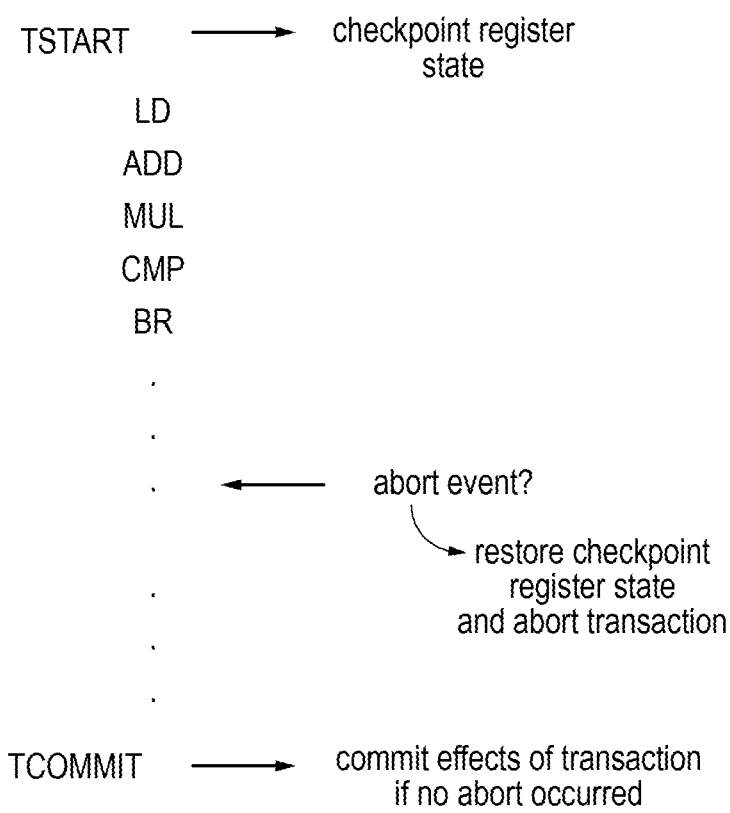
FIG. 4 illustrates an example of processing of a transaction.

A more optimistic approach for handling conflicts between threads accessing shared resources can be to use transactional memory support. A data processing system may have circuitry to support execution of a transaction within a thread of data processing by the processing circuitry. As shown in FIG. 4, the transaction comprises the instructions of the thread which are executed between a transaction start instruction TSTART marking the beginning of the transaction and a transaction end instruction TCOMMIT marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, such as a detected conflict with a memory access made by another thread, execution of a type of instruction not supported within a transaction, or the occurrence of an exception during processing of a transaction. With a transactional memory approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

Hence, if the target apparatus 4 supports transactional memory and was implemented in hardware, it would have a number of HTM resources 64 for supporting execution of instructions according to an instruction set architecture which supports the execution of transactions at an architectural level. The transactional memory support circuitry 64 may take various forms and may include a number of resources which assist with processing of transactions. For example, the transactional memory support circuitry may have restoration state storage (or checkpoint) circuitry 66 to store state captured in response to the transaction start instruction, which is restored on aborting the transaction. Also, speculative data storage circuitry could be provided for storing data to be stored to memory in response to speculatively executed store instructions. By holding the speculative data of store instructions in the speculative data storage circuitry until the transaction is committed, this avoids polluting the memory with data values which may subsequently turn out to be incorrect or may cause other threads to behave incorrectly.

In another example, the transactional memory support circuitry (in a hardware implementation of the target apparatus 4) may comprise conflict detection circuitry 68 to detect conflicts between a data access to a given address made within a transaction of a first thread and a data access to the same address made by another thread (either within a transaction or in a non-transactional thread). For example, address tracking circuitry may be provided to track the addresses accessed by instructions within a transaction. The conflict detection circuitry may detect conflict when another thread accesses one of the addresses recorded in the address tracking circuitry. When a conflict is detected, the conflict detection circuitry may trigger an abort of the transaction of the first thread for which the addresses are being tracked.

The transactional memory support circuitry could also have circuitry for detecting other events which may cause aborting of a transaction. For example, on receipt of an interrupt or exception, the transaction could be aborted. Also a transaction may be aborted if the transactional memory support circuitry runs out of resources (e.g. if the number of speculative results to be stored in the speculative result storage circuitry or the number of addresses tracked by the address tracking circuitry exceeds the capacity available within the storage provided), so that it is no longer possible to guarantee that the transaction will proceed correctly without conflict. Also, certain types of instruction may be inappropriate for being processed within a transaction and on encountering a type of instruction not allowed within a transaction the transaction may be aborted. On aborting a transaction, it may be up to software to determine whether to try to execute the transaction again or to execute an alternative code path using a non-transaction based mechanism such as using locks.

When target program code 2 written in an instruction set architecture using transactional memory is simulated on a host data processing apparatus 6, then it may be expected that the simulator program code 8 should provide software logic and data structures which perform the equivalent functions to the HTM resources 64, including the circuitry 66 for checkpointing of register state and the conflict detection logic 68. However, particularly the memory conflict detection 68 may map badly to a software simulation environment because often hardware implementations of HTM use tagging of data in caches to control the conflict detection 68, and modelling caches in software is expensive providing a significant drop in performance.

Figure 5:
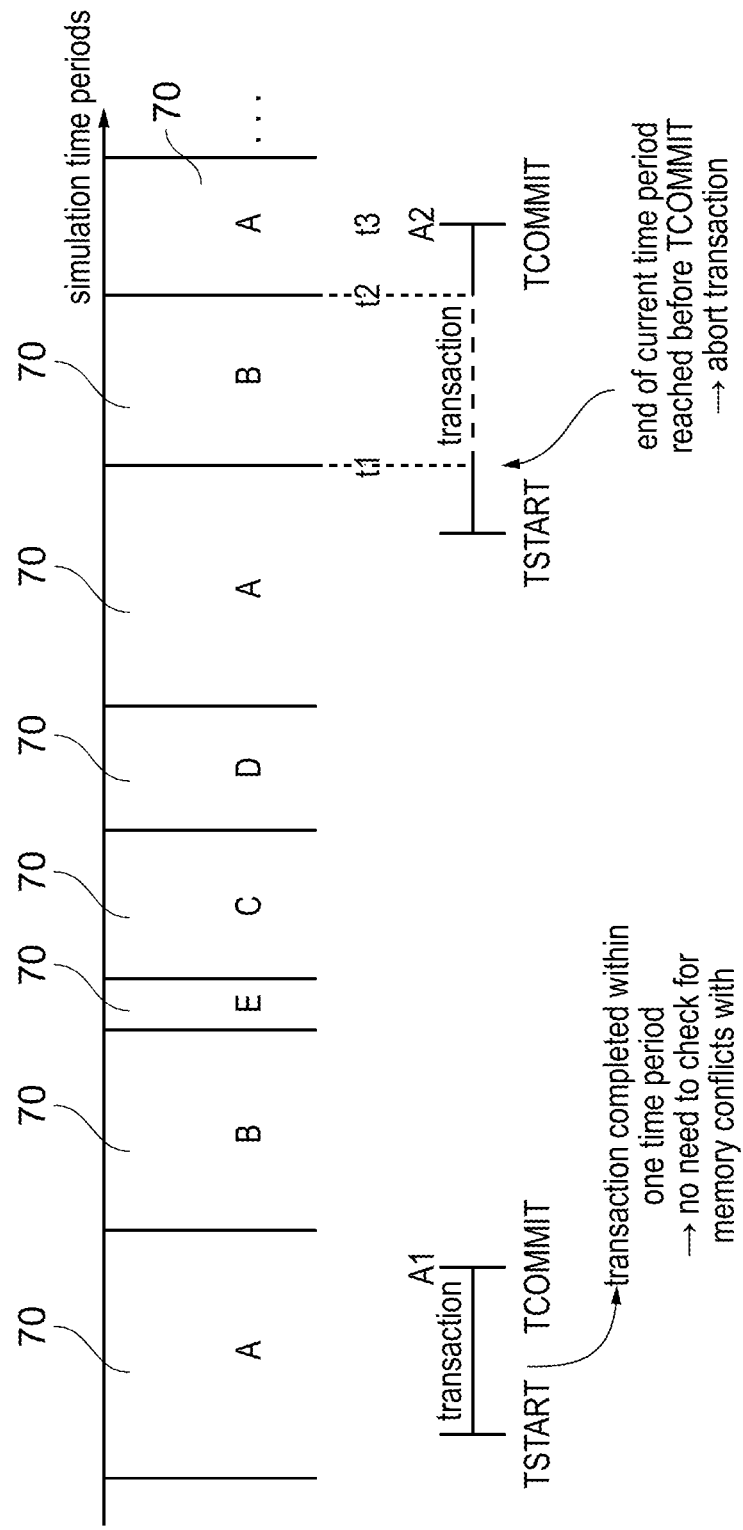
FIG. 5 illustrates an example of quantum-based simulation, in which each time period is allocated for exclusive simulation of a single simulated agent, and illustrates how a transaction is aborted if the end of the time period which includes the transaction start instruction is reached before the transaction end instruction of the transaction is reached.

FIG. 5 schematically illustrates an approach for avoiding the need to perform any memory conflict checking when stimulating the processing of target program code which includes transactional memory functionality. As shown in FIG. 5, the simulator code 8 may control the simulation of processing of the target code to based on a series of time periods (or time "quanta") 70, with each time period (or "quantum") 70 being exclusively dedicated to the simulation of a given simulated agent 60 of the target data processing apparatus. Hence, during each time period the simulator code 8 controls the host data processing apparatus 6 to execute only target code corresponding to one particular simulated agent 60. Simulation of processing of code associated with other agents would have to wait until a subsequent time period.

As shown in FIG. 5, each time period need not be of the same duration. For example, some simulated agents could be allocated longer time periods than other simulated agents. Even if generally a given simulated agent is allocated time periods of a certain time duration, sometimes the simulated agent may voluntarily relinquish its time period early to allow another simulated agent to be simulated in the subsequent time period. Also it is not essential for the simulator code 8 to schedule an equal number of time periods for each simulated agent. For example, a simulated agent A could be allocated a greater number of time slots compared to a simulated agent B. The duration of the time periods 70 could be measured by counting actual time elapsed, by counting a number of processor cycles, by counting the execution of a certain number of instructions.

FIG. 5 shows an example of two transactions A1 and A2 which are to be executed by the target code corresponding to a simulated agent A. For transaction A1, both the TSTART and TCOMMIT instructions of the transaction are encountered within the same time period 70 so that the transaction is completed within one time period. As the host resources are exclusively allocated to the simulation of agent A during this time period this means there cannot have been any conflicting memory accesses from other simulated agents between the transaction start and transaction end instructions. Therefore, there is no need to check for memory conflicts with other simulated agents and so the transaction can be allowed to commit regardless of whether any memory conflict checking is performed. That is, the simulator program code 8 need not simulate the behaviour of the conflict detection logic 68 of the target apparatus. By eliminating this memory conflict checking the performance of the simulator can be greatly improved.

In contrast, with the example of transaction A2, the transaction starts in one time period allocated to simulated agent A, but at time t1 the end of that time period is reached before the transaction end instruction (TCOMMIT) of the transaction is reached, and so in the meantime another simulated agent (B) has been allocated a time period 70 for simulation, before returning to simulated agent A in a subsequent time period. In this case, as no memory checking is performed, but it is possible that simulated agent B could have issued conflicting memory accesses to the same addresses used by the transaction, the atomic effect of the transaction can no longer be guaranteed and so the transaction is aborted. Hence, if the end of the current time period in which the transaction start instruction is detected is reached before the transaction end instruction is reached, the transaction is aborted. While a real hardware implementation of HTM would not abort transactions for this reason, it is useful in a software simulation to introduce an additional reason for aborting transactions in order to eliminate the need to perform any memory access conflict checking.

The exact timing of the detection of whether the end of the current time period was reached before the transaction end instruction and of the aborting the transaction may vary from implementation to implementation. In some cases this detection could take place when the end of the time period including the transaction start instruction is reached (i.e. time t1 shown in FIG. 5). In other examples, the detection of whether the end of the current time period was reached before the transaction end instruction was reached could be performed at time t2 at the start of the next time period allocated to the simulated agent A after the one in which the transaction start instruction was encountered. Another alternative may be to perform this detection at a time t3 when the transaction end instruction is reached. With any of these examples the aborting of the transaction could take place at any of these timings t1, t2 or t3. In some cases even if the detection is performed at time t1 or t2, some status information may be set and then the actual abort decision may be deferred until time t3 when the transaction end instruction (TCOMMIT) is reached. Hence it will be appreciated that there are a wide variety of ways of ensuring that a transaction which spans across multiple time periods for the simulator is aborted and the present invention is not limited to a particular one of these techniques.

Figure 6:
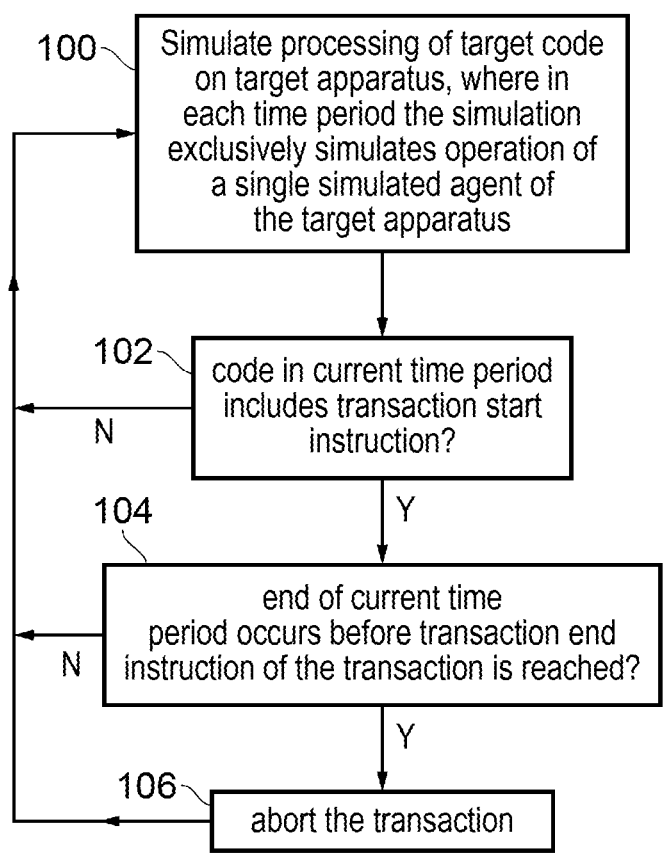
FIG. 6 is a flow diagram showing a method of performing a simulation.

FIG. 6 shows a flow diagram illustrating a method of simulating processing of target code on a target apparatus using simulator program code 8 executing on a host data processing apparatus 6. At step 100 the simulator code 8 controls the host 6 to simulate the processing of the target code 2 on the target apparatus 4 using a quantum based approach in which, in each time period, the simulation exclusively simulates the operation of a single simulated agent 60 of the target apparatus 4. At step 102 the simulator determines whether the target code processed in a current time period includes a transaction start instruction. If not the simulation continues at step 100. If a transaction start instruction is encountered then at step 104 it is determined whether the end of the current time period occurs before the transaction end instruction of that transaction is reached. If not then the transaction's outcome is simulated as normal and simulation continues at step 100. However, if it is detected at step 104 that the end of the current time period occurs before the transaction end instruction of the transaction is reached, then at step 106 the transaction is aborted. Simulation then continues at step 100. As discussed above, the particular timings of the detection at 104 and the abort at step 106 could vary from implementation to implementation.

Figure 7:
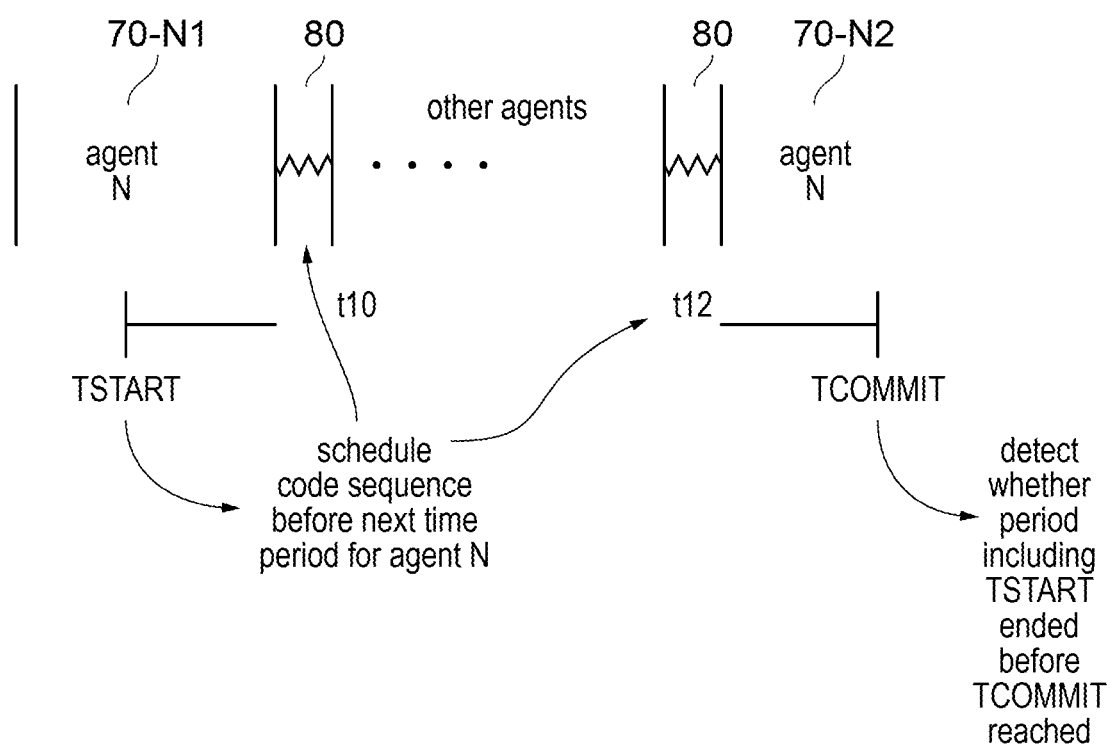
FIG. 7 schematically illustrates one approach for detecting whether the end of the current time period including the transaction start instruction is reached before the transaction end is reached.

FIG. 7 shows an example technique for controlling the detection of whether the transaction was committed before the end of the current time period. As shown in FIG. 7, when a transaction start instruction is encountered during a given time period 70-N1 allocated to simulated agent N, the simulator program code 8 may schedule a status-setting code sequence 80 to be executed at some timing before the next time period 70-N2 associated with agent N is due to execute. FIG. 7 shows two examples of possible timings at which the code sequence could be scheduled for execution, for example at timing t10 immediately following the time period 70-N1 in which the transaction start instruction was executed, or at a time t12 immediately preceding the next time period 70-N2 allocated for simulated agent N. it will be appreciated that the code sequence could also be scheduled for execution at any other intervening time between the end of time period 70-N1 and the start of the next time period 70-N2. When the code sequence 80 is executed, it sets the transaction status information 43 to a predetermined value. By default the transaction status information 43 has a value other than the predetermined value in cases where no transaction start instruction has been encountered and no instance of the code sequence has yet been executed. The simulation control data 42 may include a separate indication of the transaction status information 43 for each simulated agent 60 which could require execution of transactions (e.g. agents such as the interrupt controller E in FIG. 3 may not need to maintain transaction status information as they do not execute any code). Hence, during subsequent resumption of processing of the transaction in a later time period 70-N2, it can be detected from the status information 43 maintained for agent N whether the transaction started in a previous time window or was started in the same time window as the current time window and therefore it can be detected whether the end of the time window including the transaction start instruction was reached before the transaction end instruction was reached.

In the example of FIG. 7 the transaction status information 43 is checked in response to the transaction end instruction (TCOMMIT). However it could also be checked in response to other events. For example the simulator program code 8 could trigger the checking of the transaction status information 43 in response to a subset of instructions of a transaction, or even in response to every instruction of the transaction, or in response to each memory access instruction of the transaction. This could allow the transaction to be aborted earlier if it is detected that the transaction has been split across multiple time windows 70. This could be beneficial to improve performance, by avoiding continuing processing of a transaction which will need to be aborted for as long a time before the abort is detected. Another approach could be to schedule maintenance events at certain intervals during the time window 70 allocated to a particular simulated agent, and on occurrence of one of those maintenance events, to check the transaction status 43 to determine whether the status has a predetermined value indicating that a transaction started in the previous time period allocated to the same agent, and if so to trigger the abort.

Figure 8:
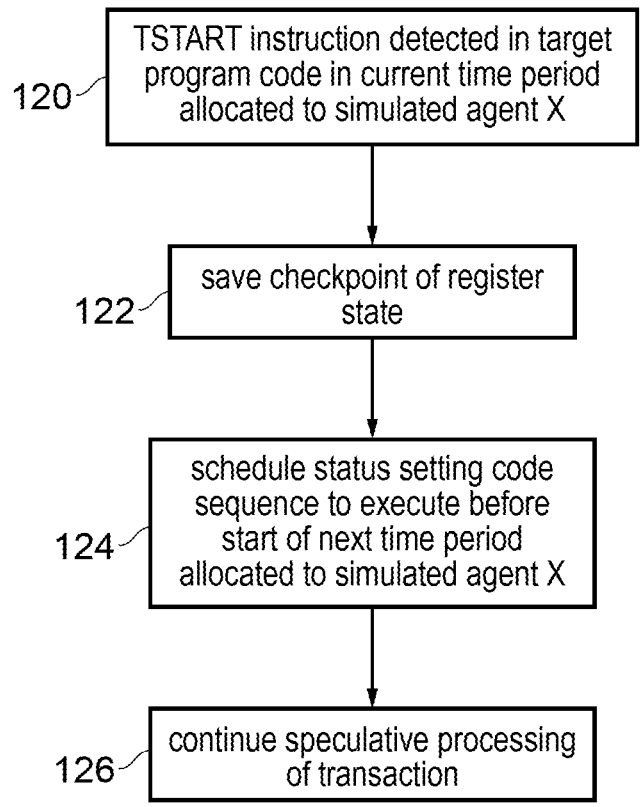
FIG. 8 is a flow diagram showing processing performed in response to the transaction start instruction.
Figure 9:
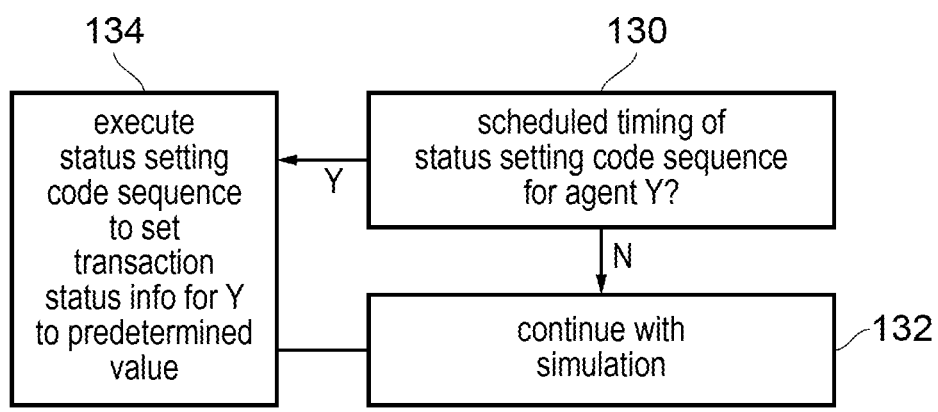
FIG. 9 is a flow diagram illustrating processing of a scheduled code sequence for setting transaction status information.
Figure 10:
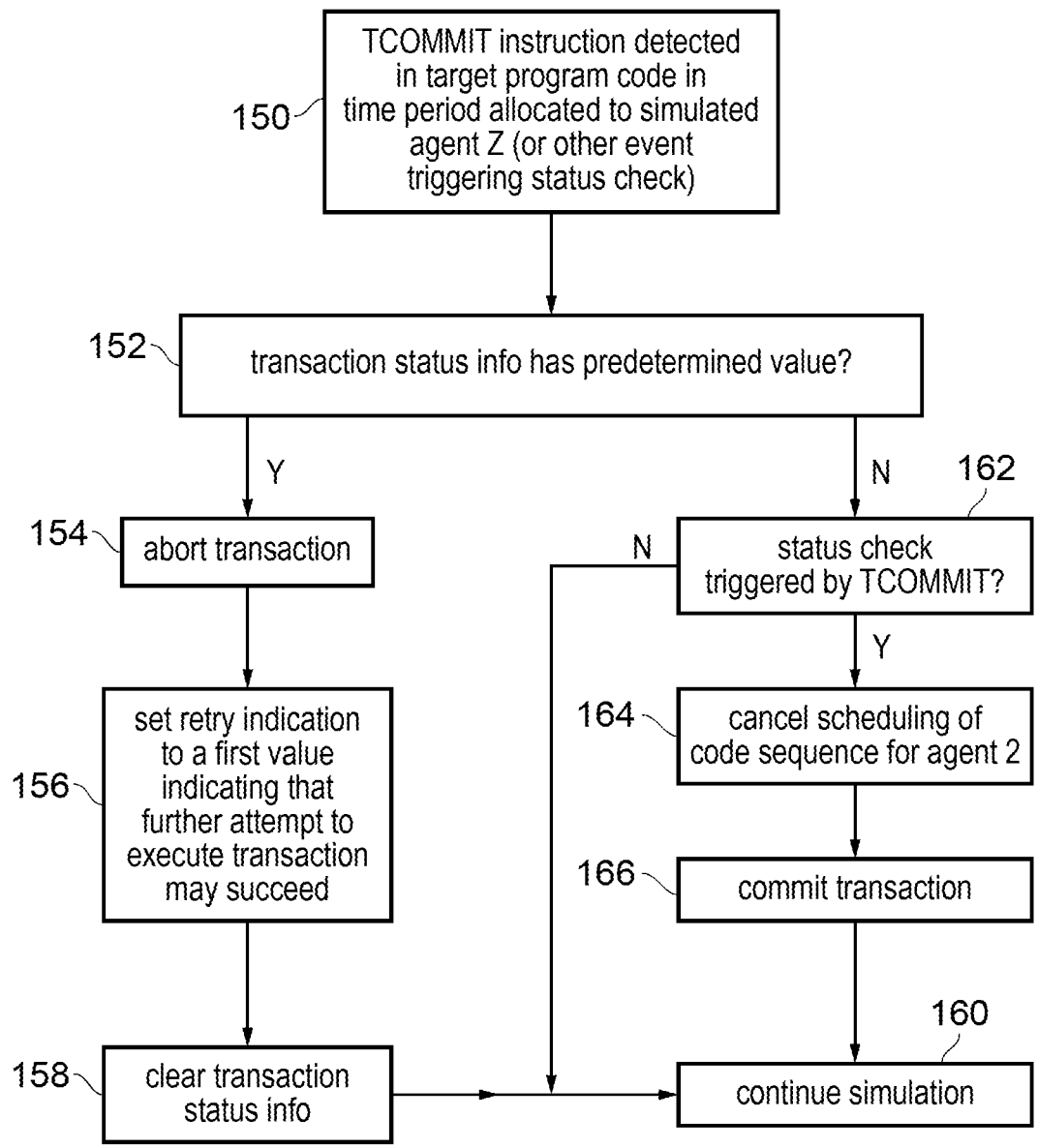
FIG. 10 is a flow diagram illustrating processing for checking the transaction status information.

FIGS. 8 to 10 show flow diagrams illustrating functionality for implementing the technique shown in FIG. 7. FIG. 8 shows processing performed in response to detection of a transaction start instruction during simulation. At step 120 a transaction start instruction is detected in the target program code executed during the current time period allocated to a given simulated agent X. In response, at step 122 the transaction simulation program logic 9 of the simulator code 8 triggers saving of a checkpoint of a register state, to enable subsequent restoration of this state if the transaction is later aborted. At step 124 the transaction simulation program logic 9 schedules a status setting code sequence 80 for setting the transaction status information 43 to execute between the end of the current time period and the start of the next time period allocated to the same simulated agent X. In some cases the transaction status information 43 may also be cleared to a value other than the predetermined value in response to the transaction start instruction (alternatively this clearing of the transaction status information 43 could take place at the start of each new time period for simulated agent X). At step 126 the simulator continues with speculative processing of the instructions at the transaction.

FIG. 9 is a flow diagram illustrating execution of the status-setting code sequence 80. At step 130 the simulator code 8 determines whether the scheduled timing for executing the status setting code sequence 80 associated with a given agent Y has been reached. If not, the simulation continues at step 132 without executing any such code sequence. On the other hand if the scheduled timing is reached, then at step 134 the status setting code sequence 80 associated with simulated agent Y is executed, so that the transaction status information 43 associated with agent Y is set to a predetermined value, and then at step 132 the simulation continues.

FIG. 10 shows a flow diagram illustrating the checking of the transaction status information in order to determine whether to abort transactions. At step 150 the simulator 8, 9 determines whether an event requiring checking of the transaction status information 43 has occurred. In some examples this event may be the transaction end instruction (TCOMMIT) being encountered within the target program code being executed in the time period allocated to the current simulated agent Z. Other examples of events triggering a status check could be the occurrence of a maintenance event scheduled at intervals during the time period allocated to agent Z, or the occurrence of other instructions in the target program code agent Z (such as memory access instructions or some other subset of instructions). When an event requiring checking of the transaction status 43 occurs, then at step 152 it is determined whether the transaction status information 43 has the predetermined value.

If the transaction status information does have the predetermined value, then at step 154 the transaction is aborted. At step 156, retry information, which is accessible to the target program code 2, is set to a first value indicating that a further attempt to execute the transaction may succeed. The retry information may be for example a flag which may be set on aborting transactions to give a hint to the target code on whether the cause of the abort is such that a subsequent attempt would be likely to succeed. For some abort causes, such as the execution of an invalid instruction, if the transaction was retried the same abort event would be likely to occur again, so in this case the retry indication could be set to a second value which indicates a further attempt to execute the transaction may not succeed. However, where the transaction is aborted for the reason shown in FIG. 10, because the transaction status information 43 indicated that the transaction was started in a previous time period 70 to the current time period, it is possible that the next time the transaction is attempted it may be scheduled for execution earlier in the time window associated with agent Z, and so may have more time to complete before the end of the time period is reached and so therefore may be successful. Hence, the loop in the target code which controls repeated attempts to execute a transaction could then use the retry information to determine that it should make another attempt, rather than for example using a different code path which does not use transactions to provide the required program functionality.

Also, at step 158 the transaction status information is cleared when the transaction is aborted, so that if another transaction starts again at a later time then the transaction status information will have a value other than the predetermined value. Simulation then continues at step 160.

On the other hand, if at step 152 the transaction status information has a value other than the predetermined value, then at step 162 it is determined whether the status check was triggered by the transaction end instruction. If not, then no specific action is required, as it still possible that the end of the current time period could occur before the transaction end instruction is reached and so at step 160 simulation continues. However, if the transaction status information does not have a predetermined value but the status check was triggered by a transaction end instruction, then there is no longer any need to continue monitoring the timing of completion of the transaction or to schedule execution of the status-setting code sequence 80, as the transaction has completed within one time period. Hence, at step 164 the scheduling of the status setting code sequence 80 (if still pending) for agent Z may be cancelled, and at step 166 the transaction is committed so that any speculative processing results become committed and their effects cannot be reversed anymore. Simulation then continues at step 160.

In some cases, at step 156, the simulation code may always set the retry indication to the first value if a transaction is aborted due to the detection that the end of the current time period occurred before the transaction end instruction was reached. It may be expected that if the transaction failed on a second attempt, then this may make it very likely that it would also fail on a third or fourth attempt as in this case it is likely that the transaction is simply longer than can be processed within one time period of the simulation. Nevertheless, it may be preferred simply to continue setting the retry indication to the first value indicating that the target program code should be retried, even if it is expected that it would fail again. This may require less complex simulator code as it means the simulator does not need to track how many times a transaction failed, but can simply set the retry indication based on the reason for the abort. Typically, target program code written using transactional memory features may include instruction for counting the number of attempts to process a given transaction, and may switch to a fall back code path if the number attempts reaches a threshold, so even if the simulator code keeps indicating that the transaction should be retried, eventually the failure of the transaction a given number of times may trigger the target program code to switch to the alternative fall back path to continue making forward progress.

However, in other approaches the simulator code can set the retry indication to the first value the first time that a transaction fails due to reaching the end of the current time period before the transaction ended. However, on a second or subsequent attempt to process the transaction, if the transaction again is aborted due to reaching the end of the current time period before reaching the end of the transaction, then this time the retry indication could be set to a second value indicating that the target program code should instead attempt to switch to the alternative code path which does not use transactions.

Note that sometimes a thread to be executed using transactional memory may involve nested transactions, where after executing a transaction start instruction for a first transaction, a further transaction start instruction is executed to represent the start of a second transaction nested within the first transaction, before the transaction end instruction of the first transaction is encountered. For example, this could be used for programs which allows multiple function entry or branch target locations within the code to which processing could branch into, where the person or the compiler preparing the code wishes to ensure that certain blocks of code are handled within a transaction regardless of whether processing has branched to a point before or after the very first transaction start instruction. While some hardware implementations could treat each nested transaction as a separate transaction, maintaining separate restoration state for each nested transaction and enabling partial unwinding to the transaction start instruction of an inner nested transaction, this may require relatively more complex resources which may not to be justified. Hence, other implementations may effectively ignore inner transactions, so that even if an abort occurs within an inner nested transaction, the state is rewound to the state which was pending at the time of the transaction start instruction associated with the outer transaction of the nested set of transactions. This means that only one set of restoration state would need to be maintained for the entire set of nested transactions.

Hence, in some implementations of the simulator, transaction start/end instructions of inner transactions of a nested set of transactions may effectively be ignored by the simulator code 8. In this case, the functionality discussed above as being performed in response to a transaction start instruction need not be performed for every transaction start instruction, but could be performed in response to the transaction start instruction of an outer transaction (i.e. a transaction start instruction encountered when no other transaction is already pending), but may be omitted for transaction start instructions of inner transactions (i.e. further transaction start instructions encountered when a transaction is already pending). Similarly, the functionality discussed above as being performed in response to a transaction end instruction need not be performed for the transaction end instruction of an inner transaction, but may be performed only for the transaction end instruction of outer transactions. For example, a nested transaction counter could be maintained by the simulator for each simulated agent to count how many transaction start instructions have been encountered during processing performed for that simulated agent, and the counter could be decremented each time a transaction end instruction is encountered during the processing performed for that simulated agent. A given transaction end instruction may be considered to be the transaction end instruction of an outer transaction when the counter indicates that there is only one remaining transaction start instruction for which the corresponding transaction end instruction has not been encountered yet.

In one example, the simulation processing performed for the plurality of simulated agents may comprise two or more threads of processing performed on a host data processing apparatus which is a uni-processor system. The two or more threads of processing may be processed by a single processor in a time-sliced fashion so that in each period of time, the uni-processor exclusively processes a single one of the threads of processing. Some threads of processing may include transactional memory functionality, and if the uni-processor system does not have hardware support for transactional memory, then transactional memory behaviour may be simulated in software within the threads. When processing the multiple threads in the time-sliced fashion on a single processor, then if one thread is processing a simulated transaction, there is no need to check for memory conflicts as there cannot be any other accesses triggered to conflicting addresses provided the transaction does not exstend beyond the end of a time slice. Hence, in such a multi-threaded environment on a uni-processor system, it can be useful to limit the duration of a transaction to one time period, and abort transactions that extend over multiple time slices, no memory conflict checking is required, improving performance.

Also, in some examples, the simulation processing performed for the plurality of simulated agents may comprise just-in-time translation of code sequences involving use of transactional memory into corresponding sequences of instructions supported by the host processor. For example, in some cases, although the target code itself may largely be written according to the same instruction set architecture as supported by the host data processing apparatus, a particular implementation of the host data processing apparatus may not provide hardware resources for supporting transactional memory, such as the circuitry for checkpointing register state or detecting address conflicts as discussed above. Hence, while in general most processing instructions of the target code may not need to be translated or simulated, certain portions of the target code including the transaction start/end instructions may need to be simulated. In this case, the simulation program controlling the simulation processing may include a translator (e.g. a just-in-time (JIT) translator) which may detect portions of code comprising transactions and map them to corresponding instructions not including transactions, with the transactional memory functionality simulated using other instructions (such as additional instructions for storing checkpointed register state to memory). Again, if a time-sliced approach is used where a single agent is exclusively simulated in each time period, and a transaction simulated by the translator is aborted if it is detected that the end of a time slice was reached before the transaction end instruction, then there is no need for the translator to simulate memory address conflict detection, which can improve performance. This can enable transactional memory functionality to be simulated at an operating system level on hardware which does not support transactional memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method comprising:
performing, in a series of time periods, simulation processing on a host data processing apparatus to simulate operation of a plurality of simulated agents of a target data processing apparatus processing target program code, in which during each of the time periods, the simulation processing exclusively simulates operation of a single simulated agent of said plurality of simulated agents; and
when the target program code processed in a current time period allocated for simulation of a given simulated agent includes a transaction start instruction representing a start of a transaction comprising one or more instructions executed between the transaction start instruction and a transaction end instruction for which effects of the instructions of the transaction are to be committed when the transaction end instruction is reached in the absence of the transaction being aborted:
detecting whether an end of the current time period occurs before the transaction end instruction of the transaction is reached; and
aborting the transaction when it is detected that the end of the current time period occurs before the transaction end instruction of the transaction is reached.

2. The method of claim 1, in which the simulation processing processes the target program code according to a target instruction set architecture specifying that the transaction should be aborted in response to detection of a conflict between a memory access triggered by an agent processing the transaction and a memory access triggered by another agent.

3. The method of claim 1, in which the simulation processing simulates processing of the transaction without checking for conflicts between memory accesses triggered by the given simulated agent and memory accesses triggered by other simulated agents.

4. The method of claim 1, in which the detecting is performed at the end of the current time period.

5. The method of claim 1, in which the detecting is performed at the start of a next time period allocated for simulation of the given simulated agent.

6. The method of claim 1, in which the detecting is performed in response to reaching the transaction end instruction.

7. The method of claim 1, comprising storing status information indicative of whether the end of the current time period occurs before the transaction end instruction of the transaction is reached.

8. The method of claim 7, in which the status information is inaccessible to the target program code.

9. The method of claim 1, comprising:
in response to the transaction start instruction, scheduling a status-setting code sequence to execute between the end of the current time period and the start of a next time period allocated for simulation of the given simulated agent, the status-setting code sequence comprising one or more instructions for setting status information to a predetermined value.

10. The method of claim 9, comprising determining whether the status information is set to the predetermined value, and aborting the transaction when the status information is set to the predetermined value.

11. The method of claim 10, comprising cancelling scheduling of the status-setting code sequence when the transaction end instruction is reached and the status information has a value other than the predetermined value.

12. The method of claim 10, wherein the determining of whether the status information is set to the predetermined value is performed in response to the transaction end instruction.

13. The method of claim 10, wherein the determining of whether the status information is set to the predetermined value is performed in response to at least a subset of instructions of the transaction.

14. The method of claim 10, wherein the determining of whether the status information is set to the predetermined value is performed in response to a maintenance event scheduled at one or more predetermined timings.

15. The method of claim 10, wherein the determining of whether the status information is set to the predetermined value is performed at the start of the next time period allocated for simulation of the given simulated agent.

16. The method of claim 1, comprising:
when the transaction is aborted in response to detecting that the end of the current time period occurs before the transaction end instruction of the transaction is reached, setting a retry indication to a first value to indicate that it is possible that a further attempt to process the transaction may be successful.

17. A non-transitory storage medium storing a computer program for controlling the host data processing apparatus to perform the method of claim 1.

18. A host data processing apparatus comprising:
processing circuitry; and
a non-transitory storage medium storing a computer program for controlling the processing circuitry to perform the method of claim 1.

19. A non-transitory storage medium storing a computer program comprising:
simulation program logic to perform, in a series of time periods, simulation processing on a host data processing apparatus to simulate operation of a plurality of simulated agents of a target data processing apparatus processing target program code, in which during each of the time periods, the simulation processing exclusively simulates operation of a single simulated agent of said plurality of simulated agents;
the simulation program logic comprising transaction simulation program logic to simulate processing of a transaction comprising one or more instructions executed between thea transaction start instruction and a transaction end instruction for which effects of the instructions of the transaction are to be committed when the transaction end instruction is reached in the absence of the transaction being aborted; in which:

when the target program code processed in a current time period allocated for simulation of a given simulated agent includes a transaction start instruction representing a start of a transaction, the transaction simulation program logic is configured to:
  detect whether an end of the current time period occurs before the transaction end instruction of the transaction is reached; and
  abort the transaction when it is detected that the end of the current time period occurs before the transaction end instruction of the transaction is reached.

\* \* \* \* \*